(12) United States Patent
Ehrhart et al.

(10) Patent No.: US 7,987,656 B2
(45) Date of Patent: Aug. 2, 2011

(54) HEADER HEIGHT CONTROL SYSTEM AND APPARATUS

(75) Inventors: Philip J. Ehrhart, Narvon, PA (US); Douglas R. Otto, New Holland, PA (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 12/558,229

(22) Filed: Sep. 11, 2009

(65) Prior Publication Data

US 2010/0000191 A1    Jan. 7, 2010

Related U.S. Application Data

(62) Division of application No. 11/332,030, filed on Jan. 13, 2006, now Pat. No. 7,603,837.

(51) Int. Cl.
*A01D 41/14* (2006.01)
*A01D 67/00* (2006.01)

(52) U.S. Cl. ............... 56/10.2 E; 56/10.2 R; 56/208

(58) Field of Classification Search ........... 56/10.2 E, 56/10.2 R, 14.9, 15.1, 15.2, 15.9, 16.2, 208–212, 56/20

See application file for complete search history.

(56) References Cited

U.S. PATENT DOCUMENTS

| | | | | | |
|---|---|---|---|---|---|
| 3,474,607 | A | * | 10/1969 | Burrough et al. | 56/209 |
| 3,485,020 | A | * | 12/1969 | Burrough et al. | 56/212 |
| 4,206,582 | A | * | 6/1980 | Molzahn et al. | 56/15.8 |
| 4,473,993 | A | * | 10/1984 | Jennings et al. | 56/208 |
| 5,115,628 | A | * | 5/1992 | Garter et al. | 56/10.2 E |
| 5,633,452 | A | * | 5/1997 | Bebernes | 73/37 |
| 5,778,644 | A | * | 7/1998 | Keller et al. | 56/11.2 |
| 5,906,089 | A | * | 5/1999 | Guinn et al. | 56/10.2 E |
| 5,964,077 | A | * | 10/1999 | Guinn | 56/10.2 E |
| 5,983,615 | A | * | 11/1999 | Schmid et al. | 56/208 |
| 6,073,431 | A | * | 6/2000 | Osborne et al. | 56/15.7 |
| 6,901,729 | B1 | * | 6/2005 | Otto et al. | 56/208 |
| 2007/0068129 | A1 | * | 3/2007 | Strosser | 56/10.2 E |
| 2009/0069988 | A1 | * | 3/2009 | Strosser | 701/50 |

* cited by examiner

*Primary Examiner* — Thomas B Will
*Assistant Examiner* — Joan D Misa
(74) *Attorney, Agent, or Firm* — Patrick M. Sheldrake; Michael G. Harms

(57) ABSTRACT

A system and apparatus for controlling height of a header of a work machine such as an agricultural windrowing machine or a harvesting machine, which includes height control cylinders jointly or individually operable for raising or lowering the opposite ends of a header to achieve a desired overall height or angle of tilt in relation to the surface of a field or pasture to be cut, and which allow the header to be raised, and lowered to the previously selected cut height, without changing the lengths of the cylinders, so as to be usable in combination with an optional header lift and/or float system.

11 Claims, 9 Drawing Sheets

HEADER HEIGHT CONTROL SYSTEM AND APPARATUS

This divisional application claims priority under 35 U.S.C. §120 from U.S. patent application Ser. No. 11/332,030 filed on Jan. 13, 2006 now U.S. Pat. No. 7,603,837 by Philip J. Ehrhart et al. with the same title, the full disclosure of which is hereby incorporated by reference.

TECHNICAL FIELD

This invention relates generally to a system and apparatus for controlling the height of a header of a work machine such as an agricultural windrowing machine or a harvesting machine, and more particularly, to a header height control system and apparatus which enables jointly or individually raising or lowering the opposite ends of a header to achieve a desired overall height and/or tilt in relation to the surface of a field or pasture, which can be used in combination with a lift and/or float system for the header, including so as to allow simply returning to a previously selected cutting height after lifting of the header therefrom.

BACKGROUND ART

Transversely or sidewardly extending, elongate headers of from about 12 feet to 30 feet and greater in length are commonly utilized on windrowing machines for cutting and windrowing crops such as cereal grains and other seed crops, as well as grasses. Historically, the headers rested on skid shoes which moved along the surface of a field or pasture, to position cutting apparatus of the header, such as an elongate sickle cutter bar or a row of disk cutters, close to the surface for cutting the stalks or stems of crops and grasses close to the surface.

More recently, it has become more desirable and customary to cut the stalks of crops higher than is possible with the header resting on skid shoes. Prior known models of windrowers used hydraulic cylinders to carry the header at the desired height with flotation springs carrying a major percentage of the header weight. Newer generations of windrowers use hydraulic cylinders and accumulators to lift the header and also provide header flotation when the header is lowered to the ground in a cutting mode. Such newer generation windrowers have been found to be efficient for cutting hay crops, but some have no provision for carrying the header above the ground while also providing a flotation capability. A flotation capability is desirable on a header carried off the ground to allow the header to be guided over obstacles and uneven ground without damaging the cutting apparatus of the header.

A windrower construction providing a float capability with the header supported above the ground is disclosed in Schmid et al. U.S. Pat. No. 5,983,615, issued Nov. 16, 1999 to Deere & Co. The Schmid et al. construction utilizes linkage arrangements in connection with opposite ends of a header of a windrower, supported by a transversely extended rock shaft rotated by a central lift cylinder, for providing a height setting capability, and float cylinders in connection with the respective linkage arrangements for providing a float capability. It appears that the Schmid et al. construction allows sideward tilting of the header as a result of contact with the ground or other obstacles. However, Schmid et al. does not appear to disclose a capability for setting or supporting the header at a sideward or transverse tilt. That is, no capability is disclosed for maintaining the sides or transverse ends of the header at different minimum heights in relation to the windrower or a surface therebelow, such as the surface of a field, pasture, or the like. Additionally, Schmid et al. does not disclose a capability for easily returning the header to a previously selected cut height and tilt after lifting of the header.

A lack of a settable sideward tilt capability has been found to be a shortcoming for several reasons, including that it does not allow for accommodating uneven terrains such as where one side of a swath of a field or pasture to be cut is higher than the other. It may also be desirable to leave stubble on a field or pasture cut at an angle so as to retain more driven snow for better moisture retention when the snow melts. Similarly, in some circumstances it can be desirable to have the capability to independently raise and lower the ends of a header to correct for undesired sideward or transverse tilt. And, in many instances, it is desirable to have the capability to easily return to an earlier selected cut height, and tilt, after lifting of the header.

Thus, what is sought is a header height control system and apparatus for a work machine such as an agricultural windrowing machine or a harvesting machine, which provides a height control capability in combination with a float capability and a sideward or transverse tilt capability, along with a return to previously selected cut height capability, and which otherwise overcomes one or more of the shortcomings and limitations set forth above.

SUMMARY OF THE INVENTION

What is disclosed is a height control system and apparatus for a header of a work machine such as an agricultural windrowing machine or a harvesting machine, which provides both a height control capability and a lateral or sideward tilt capability, and which can be used in combination with an optional float capability, and a capability to return to a previously selected cut height after lifting, so as to overcome one or more of the problems and shortcomings set forth above.

According to a preferred embodiment of the invention, a height control system for a header of a work machine is disclosed, which includes header support apparatus connecting a sidewardly extending header to a frame of a work machine, the apparatus including first and second height control cylinders disposed in supporting relation to opposite first and second end portions of the header, respectively. The height control cylinders are controllably variable in length for supporting the first and second end portions of the header at selectable heights relative to the frame, respectively, each of the height control cylinders being connected to the frame by a connection which allows the height control cylinder and the end portion of the header supported thereby to be lifted from a selected height, and returned to the selected height, without changing the length of the height control cylinder. As a result, the height control cylinders can be jointly operated for moving the header to a selected overall height in relation to the frame, or individually operated for moving the header to a selected transverse or sideward angular orientation or tilt in relation to the frame. And, the ability of the header to be lifted from a selected height allows utilization with a float and/or lift system, for instance, including one or more additional lift cylinders, to allow providing those functions in conjunction with the height control capability.

According to another preferred aspect of the invention, the system includes a fluid control circuit in connection with the height control cylinders and operable by an operator in a height setting mode for jointly extending or retracting the height control cylinders for positioning the header at an even overall height in relation to the frame, or a surface beneath the header, such as the surface of a field or pasture, and in a tilt setting mode for individually extending or retracting the height control cylinders, for orienting the header at a desired lateral or sideward angle of tilt in relation to the frame, or for moving the header from a tilted orientation to a more even overall height orientation.

According to still another preferred aspect of the invention, the work machine can be an agricultural windrowing machine, a harvesting machine, or the like.

DETAILED DESCRIPTION OF THE INVENTION

Figure 1:
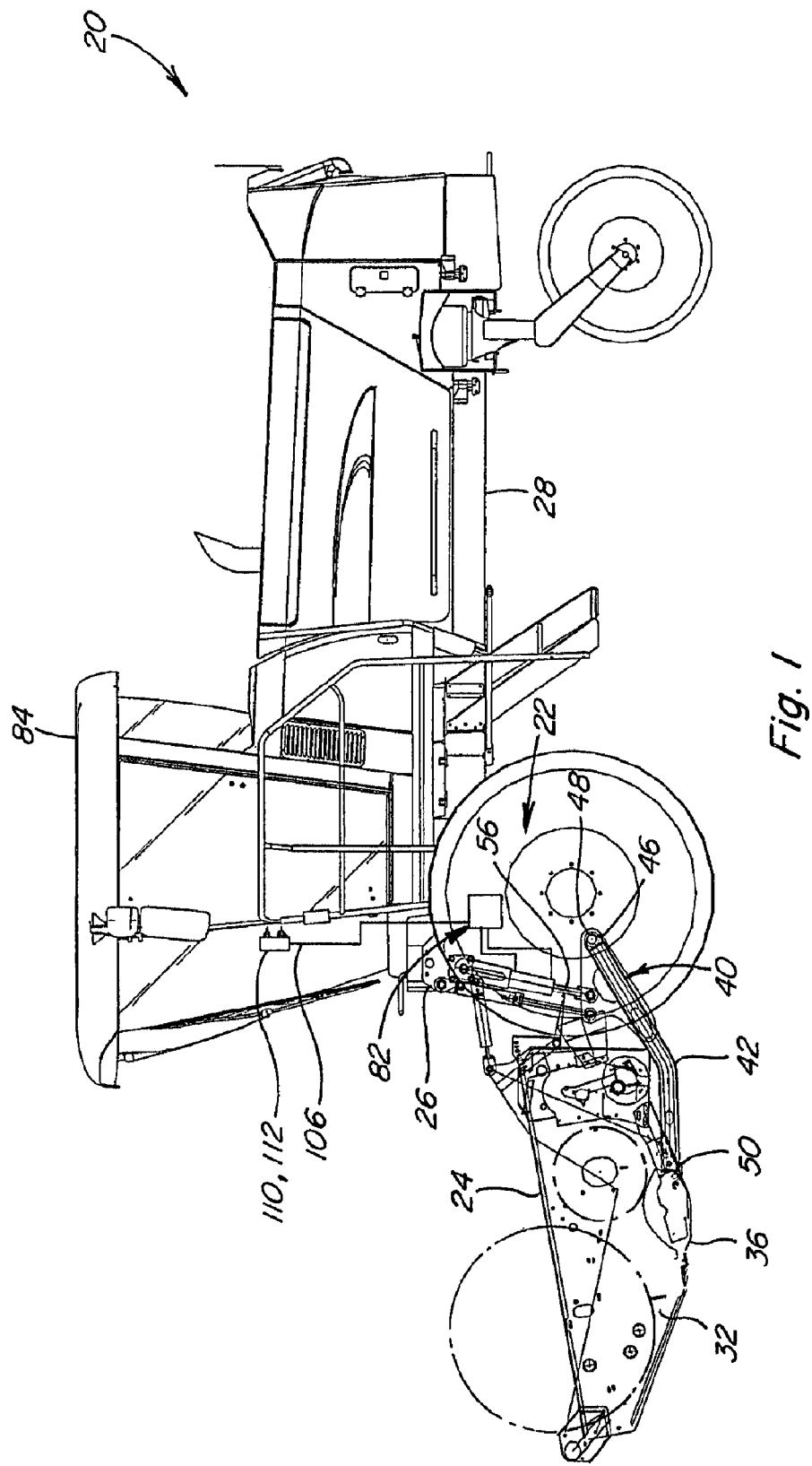
FIG. 1 is a side view of a representative windrowing machine including a header height control system and apparatus of the invention.
Figure 2:
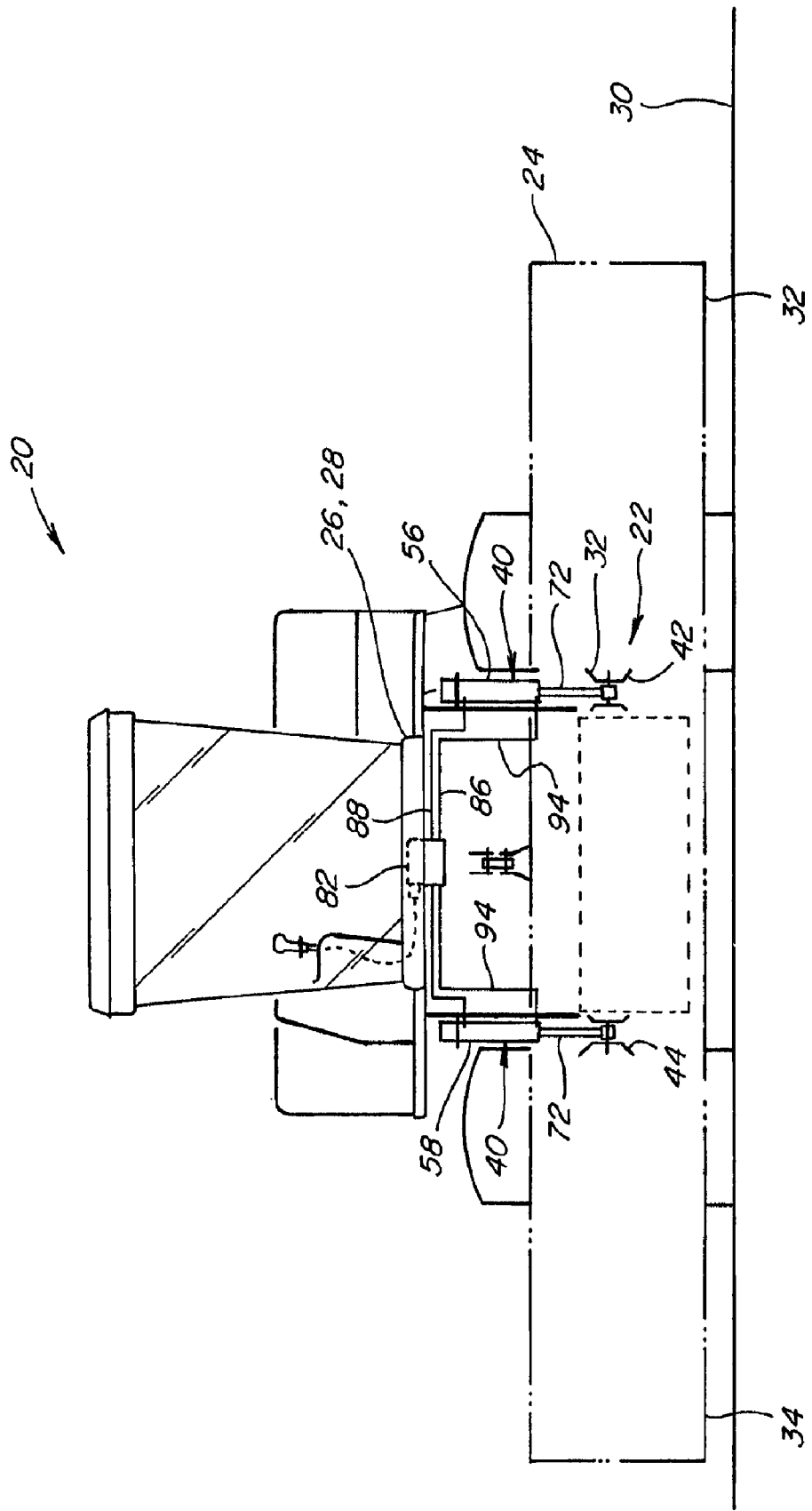
FIG. 2 is a simplified schematic front view of the machine of FIG. 1.

Referring now to the drawings, in FIGS. 1 and 2, an agricultural windrowing machine 20 is shown, including a header height control system 22 constructed and operable according to the teachings of the present invention. Header height control 22 is operable for controllably moving a header 24 supported on a front end 26 of machine 20, upwardly and downwardly, through a range of height positions in relation to a frame 28 of machine 20, and for holding header 24 at a selected height position so as to prevent downward movement from that position. While holding header 24 at a selected position, height control system 22 will still allow upward movement of the header, for such purposes as to facilitate passage over raised regions of the terrain and obstacles and the like, and to allow lifting the header for purposes such as facilitating turning machine 20 at the end of a swath through a field or pasture, travel over roads and lanes, and other purposes, with the capability to precisely return to the previously selected height, from the raised or lifted position, without having to manually seek that height.

Windrowing machine 20 is intended to be representative of a wide variety of windrowing machines, as well as crop harvesting machines and other work machines having a header which is desired or required to be positioned at one or more selectable heights and angles of sideward tilt in relation to the machine itself, as well as to a surface over which the machine is driven, such as the surface of a field or pasture containing crops or grasses to be windrowed, which surface is represented here by line 30 in FIG. 2 and in subsequent figures.

Header 24 is of conventional, well known construction, and is an elongate structure of sheet metal or similar construction extending transversely or sidewardly across the front of machine 20 and including opposite first and second end portions 32 and 34. A front, lower portion of header 24 extending between end portions 32 and 34 includes cutting apparatus 36, which can be, for instance, an elongate cutter or sickle bar, or a plurality of disk type cutters, constructed and operable in the well known, conventional manner, for severing stalks of plants, such as grains and grasses from a field or pasture over which machine 20 is moved, for gathering and deposition onto the surface of the field or pasture in a windrow, as is also well known in the art. The lower portion of header 24 can also include skids (not shown) for supporting the lower portion of header 24 and cutting apparatus 36 in close proximity to the surface of a field or pasture in the well known manner.

Here, it is noted that as an alternative to using skids in the conventional manner to support header 24 and cutting apparatus in close proximity to a field or pasture, it has been found that it can be advantageous to position cutting apparatus 36 at some height above the surface of a field or pasture, for reasons such as to avoid the occurrence of possible damage to cutting apparatus 36, such as can result from contact with objects such as rocks or field stones that may be located on the surface of the field or pasture, and for leaving stubble on the field of a particular height, for instance, for purposes such as for retaining snow for later melting and absorption into the soil of the field or pasture, or minimizing the amount of straw that must be processed by the combine. Whether in close proximity to or at a raised height above the surface of a field or pasture, it is also advantageous for header 24 to still be movable upwardly, for instance, so as to be able to move over obstacles on the surface of the field or pasture, and over elevated regions of a swath, and also to have the capability to lift or raise the header from the selected position when the end of a swath over a field or pasture is reached, for turning machine 20 around for alignment with another swath, and for travel over public and/or private roads, paths, or driveways, and the like. It is also advantageous after raising the header, to have the capability to lower the header to the same cut height position that was selected prior to raising the header, without having to manually seek the previously selected cut height.

Still further, in some instances, it has also been found to be advantageous to have the capability of orienting and holding a header such as header 24 at a transverse or sideward tilt in relation to its normal, generally overall even position in relation to machine 20 and a surface over which it is driven, for purposes such as cutting crops or grasses at an angle such that one side of a swath is higher than the opposite side, which may be desirable, for instance, for better retaining driven snow, or for facilitating windrowing over a sideward incline, or for passage over a swath of a field or pasture where one side of the swath is higher than the other. As explained hereinbelow, header height control system 22 is operable for providing these capabilities. That is, system 22 is controllably operable for positioning header 24 at a desirable overall height in relation to machine 20 and a surface on which it is located, while allowing lifting of the header as required or desired for passage over obstacles, end of swath turns and travel over roads and the like. System 22 is also controllably operable in a tilt mode for varying the transverse or sideward angular orientation or tilt of header 24 relative to frame 28, for instance, so as to be sidewardly tilted in relation thereto, and also to reduce or eliminate sideward tilting of the header relative to the frame, that is, to correct an undesired tilt, for instance, resulting from conditions wherein wheels on one side of machine 20 are lower than those on the other side, such as when moving through a rut, swail, depression, or the like.

Figure 3:
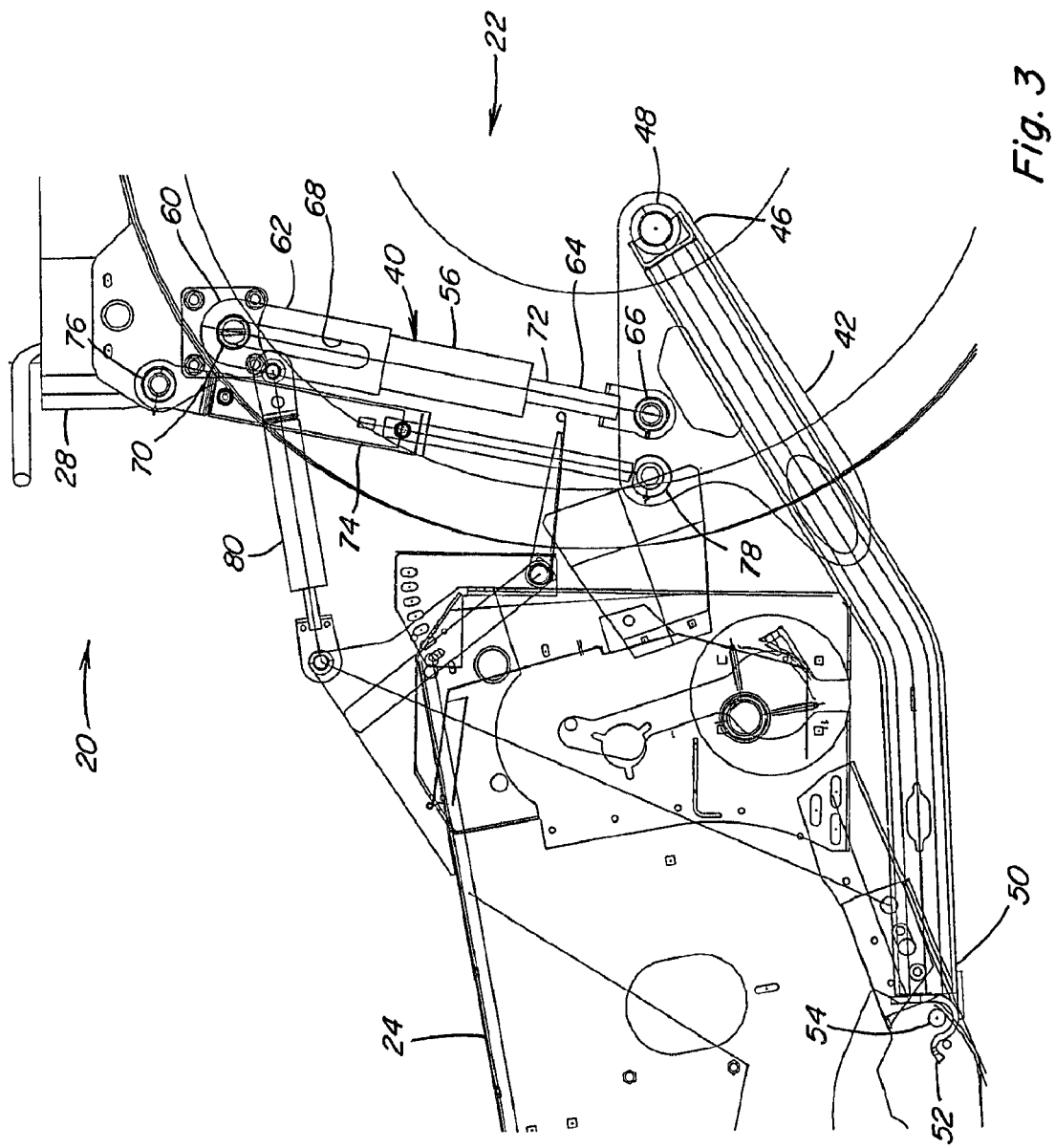
FIG. 3 is an enlarged, fragmentary simplified schematic side view of the front end of the machine, showing elements of the apparatus of the invention for positioning the header of the machine at a first position.
Figure 4:
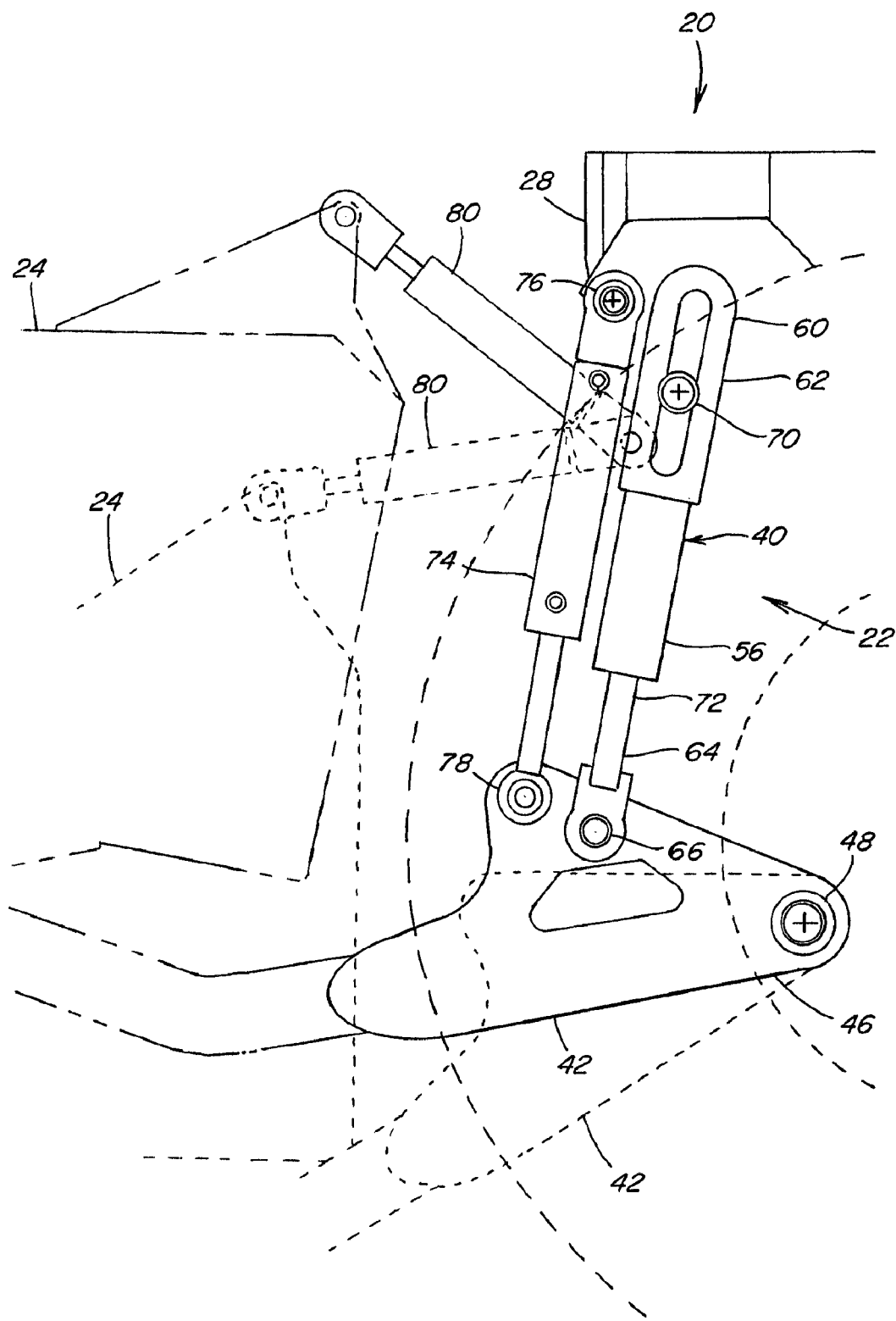
FIG. 4 is another enlarged, fragmentary simplified schematic side view of the front end of the machine, illustrating the header lifted by a lift cylinder of the machine.
Figure 5:
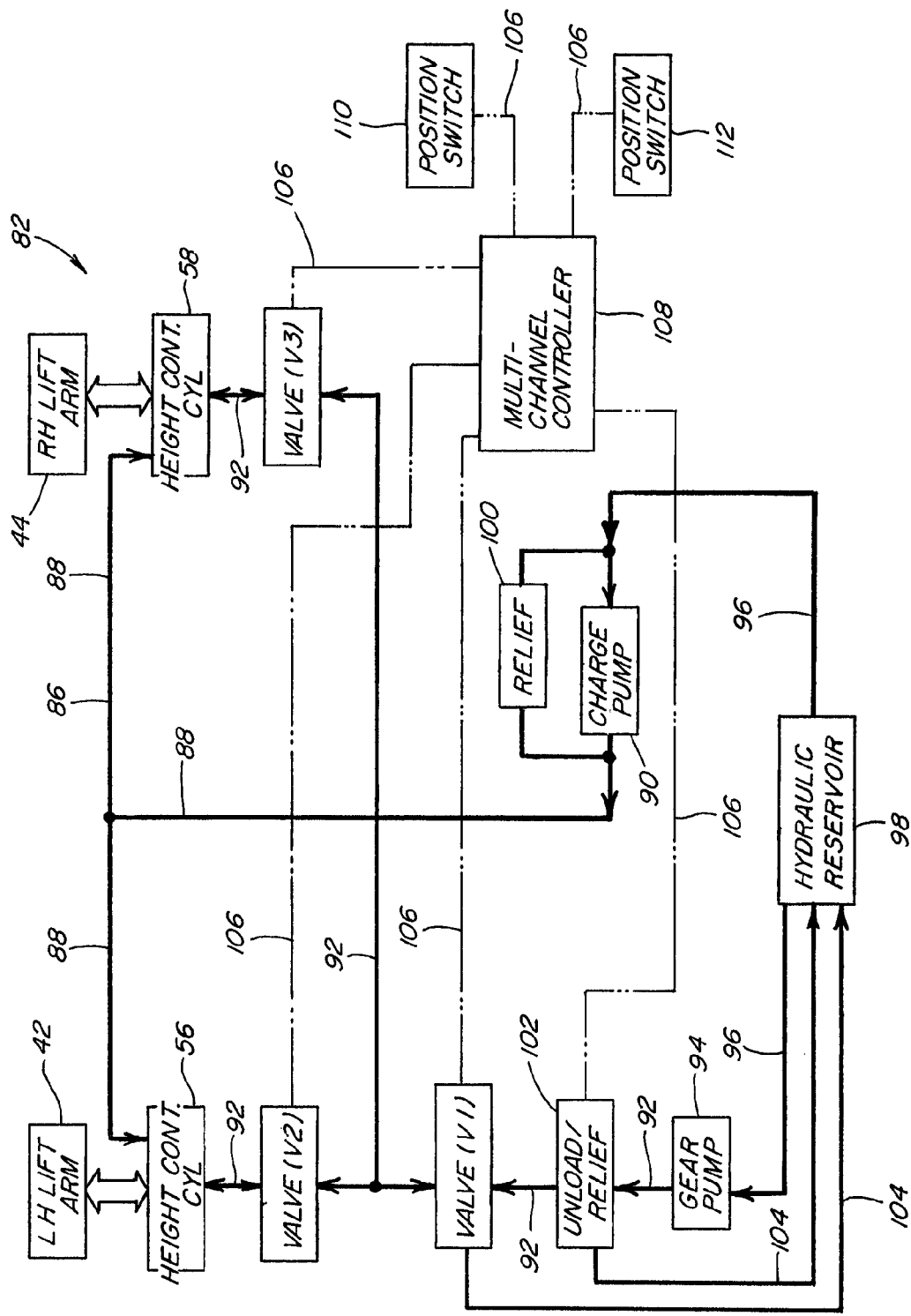
FIG. 5 is a simplified schematic representation of elements of the apparatus and a fluid control circuit of an operator control system of the invention.

Referring also to FIGS. 3, 4 and 5, header height control system 22 includes header support apparatus 40 connecting header 24 to frame 28 of machine 20 for upward and downward movement in relation thereto, and for holding header 24 in a selected height position. Additionally, apparatus 40 is operable for effecting sidewardly or laterally tilting header 24 as desired or required for a particular application, and for adjusting, reducing, or eliminating tilting. Apparatus 40 preferably includes a pair of elongate lift arms 42 and 44 or other suitable structure, pivotally connected to opposite sides of front end 26 of frame 28 so as to extend forwardly therefrom. Each lift arm 42 and 44 includes a first end portion 46 connected by a pivotal connection 48 to the side of frame 28 for upward and downward movement of the lift arm in relation thereto, and a second end portion 50 disposed forwardly of frame 28 and including a lift hook 52 or other suitable element adapted for cooperatively receiving a lift pin 54 on a respective end portion 32 or 34 of header 24, or otherwise connecting to header 24, for raising or lowering that end portion of header 24.

Header support apparatus 40 additionally preferably includes first and second height control cylinders 56 and 58 located adjacent to the opposite sides of frame 28 and pivotally connected thereto and to the first and second end portions 32 and 34, respectively, of header 24. Referring more particularly to FIGS. 3 and 4, each of the height control cylinders 56 and 58 preferably includes a first end portion 60 connected by a slotted connection 62 to frame 28, and an opposite second end portion 64 connected by a pin 66 to lift arm 42 or 44, adjacent first end portion 46 thereof. Slotted connection 62 of each cylinder 56 and 58 preferably includes an elongate slot 68 which cooperatively receives a pin 70 for longitudinal movement therein, as illustrated by the different positions of pin 70 in slot 68 as shown in FIGS. 3 and 4. Each of cylinders 56 and 58 includes a rod 72 extendible therefrom for pivotally moving the respective lift arm 42 or 44 downwardly in relation to frame 28, and retractable for raising the arm 42 or 44. Lowering of the respective lift arm 42 or 44 will correspondingly lower the respective end portion 32 or 34 of header 24 supported thereby, and raising arm 42 or 44 will raise the corresponding end portion 32 or 34. In this way, the height of respective end portions 32 and 34 of header 24 relative to frame 28, and also to a surface below header 24, such as denoted by line 30 in FIG. 2, can be maintained, thus preventing movement or falling of the respective end portion 32 or 34 below the selected height position. However, slotted connection 62 of each cylinder 56 and 58 allows upward movement of the respective end portion 32 and 34 from the selected height position by virtue of the ability of the cylinder 56 or 58 to move upwardly relative to pin 70 disposed in slot 68 of connection 62. As noted above, such upward movement of end portion 32 or 34 of header 24 can result from contact with a raised or elevated portion of a surface over which header 24 is moved, resulting from uneven terrain or the like, contact with obstacles such as rocks or stones that may be present on or project upwardly from the surface of a field or pasture, or the like. Upward movement can also occur as a result of intentional lifting of header 24, such as is typically desired when the end of a swath through a field or pasture is reached, to facilitate turning of machine 20. This capability is best illustrated by the alternative positions of lift arm 42 and header 24 illustrated in dotted and phantom lines in FIG. 4.

Here, it should be noted that such anticipated upward movements of lift arms 42 and 44 and first and second end portions 32 and 34 of header 24 can be yieldably resisted or effected by one or more optional lift cylinders or float apparatus that can be provided in association with height control system 22. For example, machine 20 is shown including a pair of lift cylinders 74 disposed adjacent to and generally parallel to height control cylinders 58 and 56. Each lift cylinder 74 is pivotally connected to the corresponding side of frame 28 by a pivotal connection 76, and to lift arm 42 or 44 by a pivotal connection 78. In a float mode, lift cylinders 74 can be operated to partially support lift arms 42 and 44, and thus end portions 32 and 34 of header 24, and can also provide a desired degree of resilient resistance to upward movement thereof. In a lift mode, cylinders 74 can be actuated to retract such that a connected end portion 32 or 34 of header 24 is lifted or raised from the selected height position as established by the respective height control cylinder 56 or 58. Importantly, by virtue of slotted connections 62, height control cylinders 56 and 58 allow such upward movement without requiring changing the lengths of the height control cylinders. In this regard, slots 68 are preferably sufficiently long to allow substantially full extension and retraction of cylinders 74, as illustrated. As a result, first and second end portions 32 and 34 of header 24 can be jointly, or individually, raised and lowered relative to frame 28 to achieve a desired or selected height, while also providing optional float and lift capabilities for the respective end portions.

Here, it should also be recognized that forward and rearward tilt and/or orientation of header 24 can be controlled or varied, as desired or required for a particular application, by a fore and aft tilt cylinder 80 or other suitable apparatus provided for this purpose and operable in the well known manner. It should also be recognized and understood that although it is preferred to provide individual lift cylinders 74 in association with the respective height control cylinders 56 and 58, a single lift cylinder or other lift apparatus could be utilized, as desired or required for a particular application. Apparatus can also be provided (not shown) for locking header 24 in a raised position for compliance with regulations governing travel over public roads.

Referring also to FIG. 5, height control system 22 of the invention additionally preferably includes an operator control system 82 controllably operable by an operator in an operator cab 84 of machine 20, for effecting upward and downward movements of header 24, including tilting movements thereof, as desired or required for a particular application. Operator control system 82, preferably includes a fluid control circuit 86 in connection with height control cylinders 56 and 58, including fluid lines 88 connecting upper ends of height control cylinders 56 and 58 with a charge pump 90, and fluid lines 92 connected to lower ends of cylinders 56 and 58 and a gear pump 94 through a series of valves controllably operable for distributing pressurized fluid to the cylinders as required for effecting desired movements thereof as will be explained hereinafter. Charge pump 90 and gear pump 94 both have suction ends connected by fluid lines 96 to a hydraulic reservoir 98 and will typically be constantly in operation during operation of machine 20 for providing supplies of pressurized fluid to cylinders 56 and 58 upon command. Here, it should be noted that although pump 94 in the preferred embodiment is identified as a gear pump, pump 94 could alternatively be a piston pump, a gerotor pump, or other suitable high pressure pump. A pressure relief valve 100 is connected to fluid lines 88 and 96 in parallel relation to charge pump 90 to allow fluid circulation and flow to reservoir 98 if the fluid output of pump 90 is dead headed or severely restricted and when fluid is displaced from the upper end of either of cylinders 56 and 58. An unload/relief valve 102 is disposed in fluid line 92 between gear pump 94 and cylinders 56 and 58, and is connected to hydraulic reservoir 98 by a fluid return line 104. Valve 102 is automatically operable in a relief mode to return fluid pumped by pump 94 to reservoir 98 in the event of dead heading or severe restriction of the output of that pump. A valve denoted at V1 is also disposed in fluid line 92, between unload/relief valve 102 and cylinders 56 and 58, and has a port connected to reservoir 98 by a fluid return line 104. A valve V2 is disposed in line 92 between valve V1 and cylinder 56, and a valve V3 is disposed in line 92 between valve V1 and cylinder 58. Unload/relief valve 102, and valves V1, V2 and V3, are each connected by a conductive path 106 to a multi-channel controller 108, which is preferably a microprocessor or other suitably based controller, operable outputting commands or otherwise for changing the positions or operating states of the valves, respectively. Conductive paths 106 can be, for instance, wires of a wiring harness, optical signal paths, or wireless paths, as desired or required. Controller 108, in turn, is connected by conductive paths 106 to one or more operator input devices, which can be, for instance, a pair of hand or foot operable position switches 110 and 112, operable for inputting operator commands to or otherwise controlling controller 108. Position switches 110 and 112 are preferably located in operator cab 84 as generally illustrated in FIG. 1.

In operation, operator control system 82 is operator controllable in height and tilt setting modes using position switches 110 and 112 to retract and extend cylinders 56 and 58 jointly or individually, for effecting corresponding upward and downward movements of lift arms 42 and 44, for moving end portions 32 and 34 of header 24 upwardly and downwardly, as desired or required for selecting or setting a desired overall height and/or sideward tilt of header 24. Once a selected height position and/or tilt of header 24 is achieved or reached, operation of switches 110 and 112 can be discontinued, and height control system 22 will hold the header at that height and/or tilt. That is, system 22 will essentially prevent header 24 from falling or moving below the selected height. Upward movement is still allowed, however, as slotted connections 62 of each of respective cylinders 56 and 58 allow those cylinders to be lifted or raised without changing the length thereof, which enables end portions 32 and 34 to be raised or lifted from the selected height, for instance, as a result of contact between header 24 and raised portions of a surface over which header 24 is being moved, obstacles, and the like, or from lifting of one or both of the end portions by one or both lift cylinders 74, as discussed above. Examples of various of the possible operating modes of operator control system 82 of height control system 22 are discussed hereinafter and illustrated in FIGS. 6-13.

Figure 6:
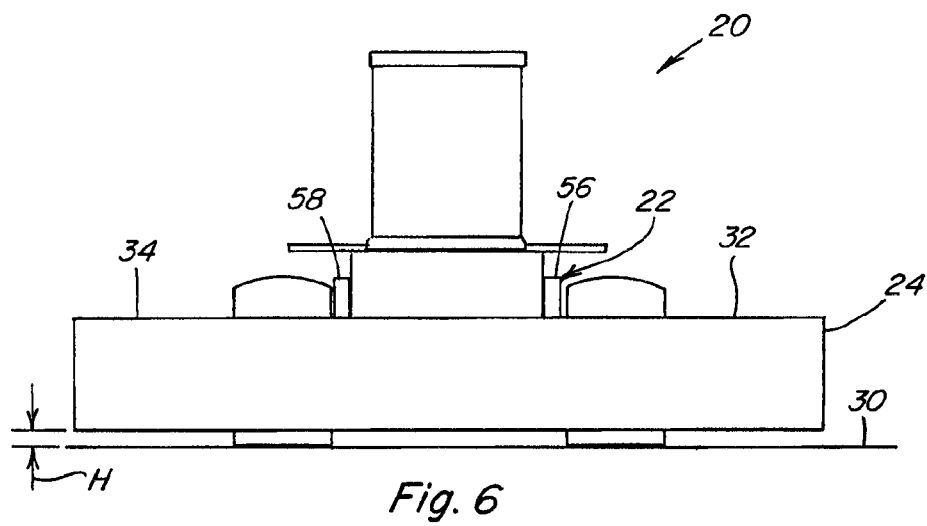
FIG. 6 is a simplified schematic front view of the machine, showing the header thereof positioned at a selected height above a surface therebelow.
Figure 7:
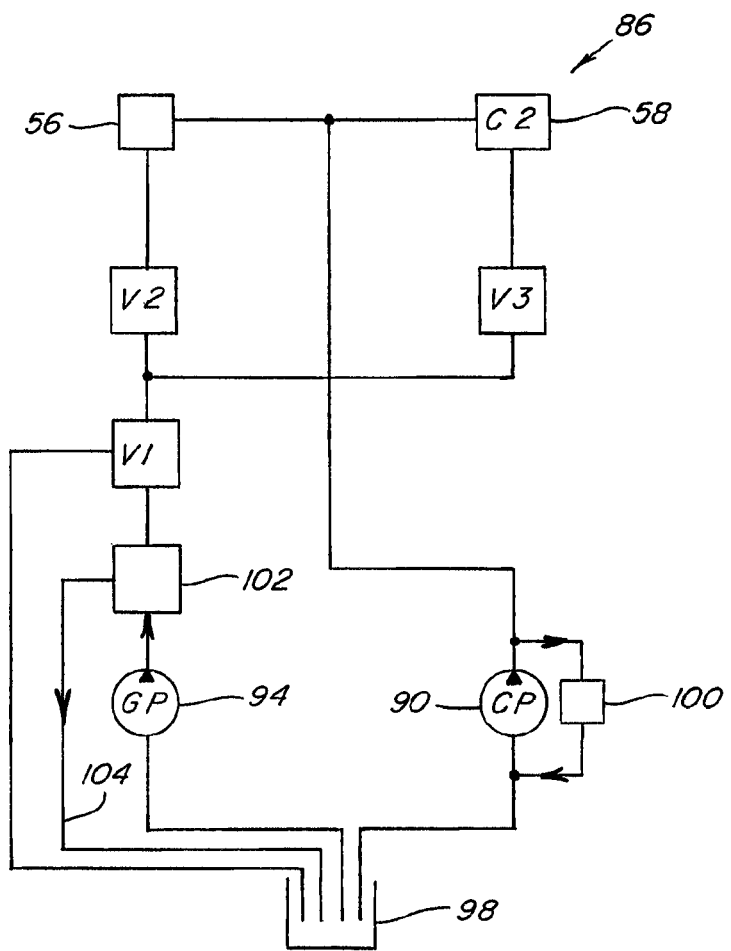
FIG. 7 is a simplified schematic representation of the fluid control circuit and apparatus of FIG. 5 in an operating mode for holding the header as illustrated in FIG. 6.

Referring to FIG. 6, machine 20 is illustrated with each of end portions 32 and 34 of header 24 supported by height control system 22 at a selected height H above a line 30 therebelow representative of the surface of a field or pasture over which header 24 is to be moved or is moving. Referring also to FIG. 7, fluid control circuit 86 is illustrated in simplified form in an operating mode which is a holding mode, for controlling cylinders 56 and 58 for holding header 24 at a selected height position, such as the height H illustrated in FIG. 6. In this mode, unload/relief valve 102 is commanded by controller 108 (FIG. 5) to operate in its relief mode to direct fluid continuously pumped by gear pump 94 through fluid return line 104 back to reservoir 98, such that fluid from that pump is not directed to either of fluid cylinders 56 and 58. Valves V2 and V3 are commanded to close, such that no fluid is allowed to escape from the lower portions of cylinders 56 and 58, and such that fluid pumped by charge pump 90 is unable to extend either of the cylinders, and instead, is circulated through relief valve 100. As a result, fluid cylinders 56 and 58 are each maintained or locked at the length selected by an operator using position switches 110 and 112 (FIGS. 1 and 5), but header 24 is still movable upwardly by virtue of the slotted connections 62 (FIGS. 3 and 4). Again, such upward movement can be effected by contact between header 24 and an obstacle or a raised portion of a field or pasture, or by operation of one or both of the lift cylinders 74.

Figure 8:
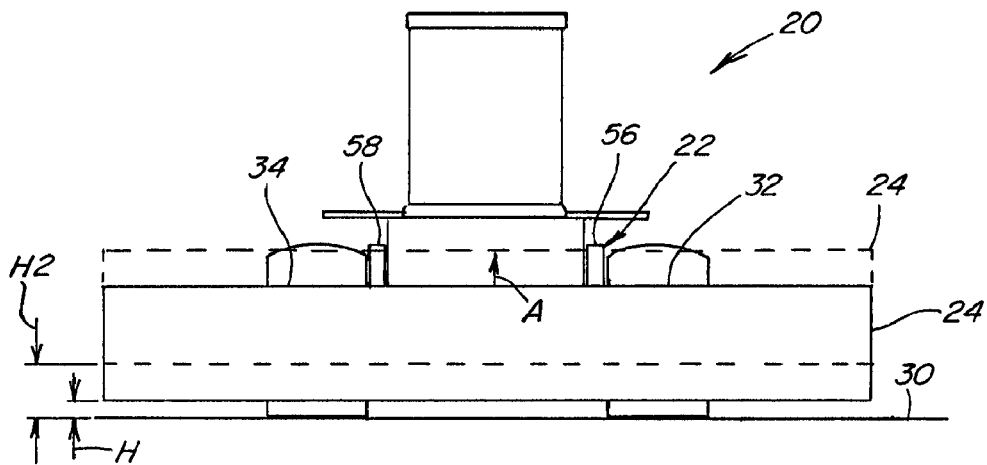
FIG. 8 is another simplified schematic front view of the machine of FIG. 1, showing the header in solid lines at a first selected height, and in dotted lines moved to a second selected height greater than the first height.
Figure 9:
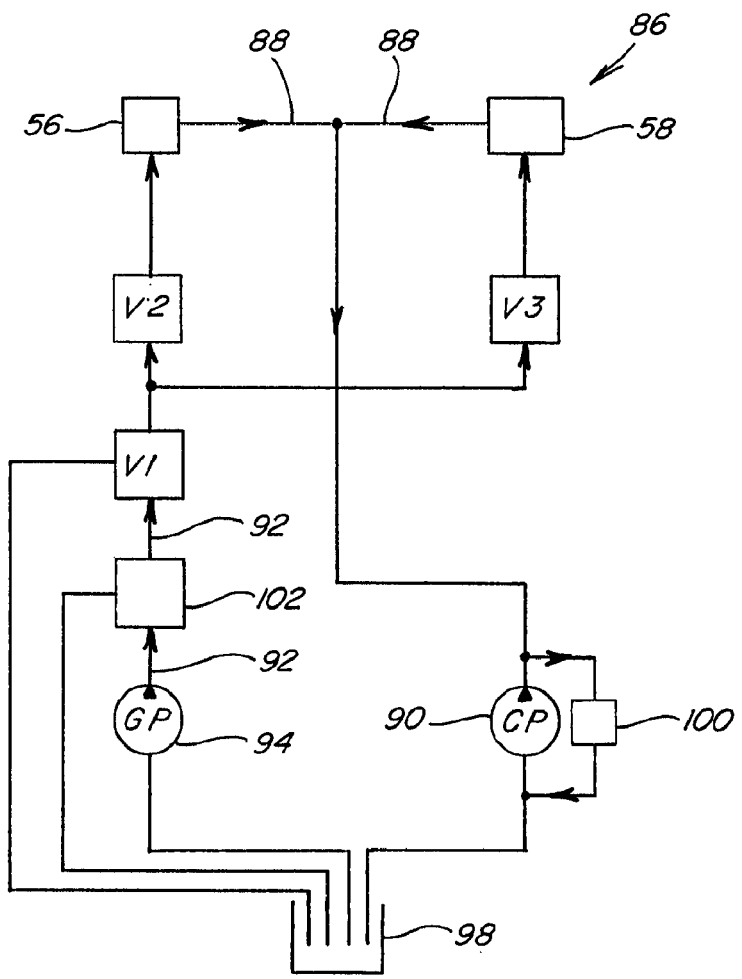
FIG. 9 is another simplified schematic representation of the fluid control circuit and apparatus of FIG. 5, in an operating mode for moving the header upwardly as illustrated in FIG. 8.

As another example, referring to FIG. 8, header 24 of machine 20 is illustrated in solid lines at height H above line 30, and in dotted lines evenly raised or lifted, as denoted by arrow A, to a new selected height H2 by operation of fluid control circuit 86 under control of switches 110 and 112 (FIGS. 1 and 5) simultaneously in an upwardly moving height setting mode, as illustrated in FIG. 9.

Referring to FIG. 9, in this height setting mode, charge pump 90 and gear pump 94 are again continuously operating to pump pressurized fluid, and unload/relief valve 102 and valve V1 are both commanded by controller 108 (FIG. 5) to be in operating states to allow pressurized fluid to flow from gear pump 94 through fluid lines 92 to valves V2 and V3. Valves V2 and V3 are commanded to open, to allow fluid flow to the lower ends of cylinders 56 and 58. This causes a displacement of fluid from the upper ends of cylinders 56 and 58 into lines 88, which is allowed as a result of the presence of relief valve 90, such that cylinders 56 and 58 are simultaneously retracted to lift both end portions 32 and 34 of header 24 simultaneously.

Figure 10:
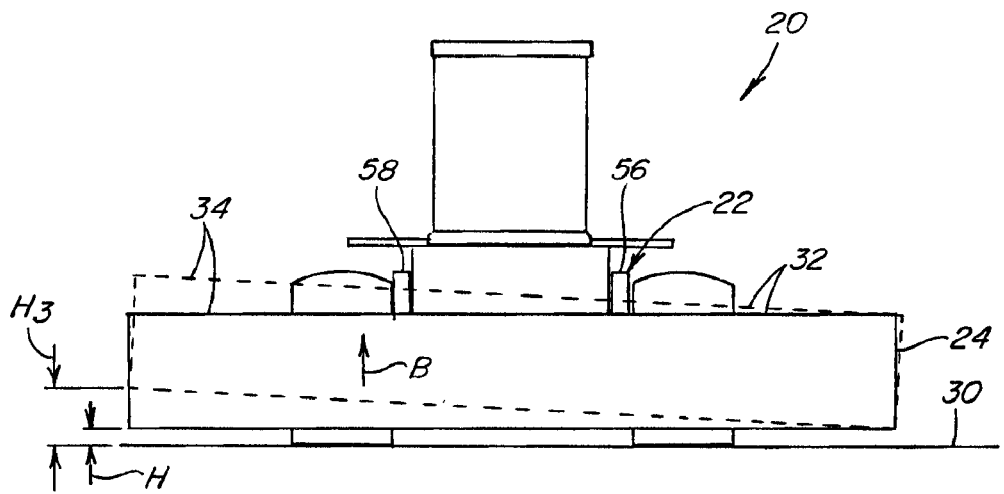
FIG. 10 is another simplified schematic front view of the machine of FIG. 1, showing the header thereof in solid lines at a selected level or even orientation in relation to a surface therebelow and in hidden lines oriented at an acute angle to the surface.
Figure 11:
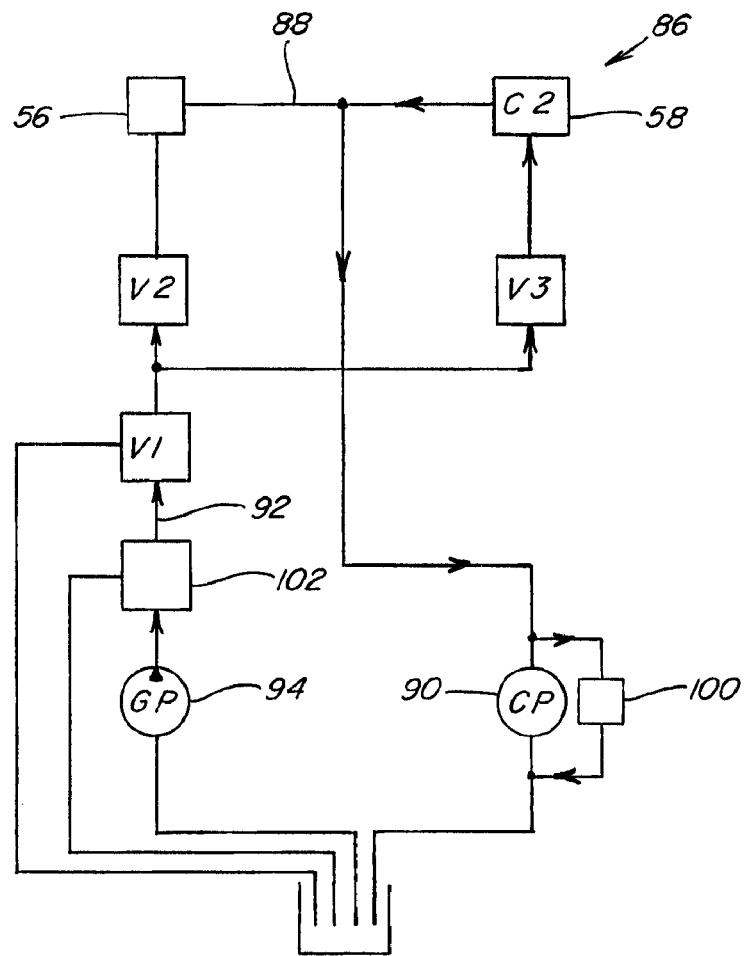
FIG. 11 is another simplified schematic representation of the fluid control circuit and apparatus of FIG. 5, in an operating mode for tilting the header as illustrated in FIG. 10.

In FIG. 10, machine 20 is shown with header 24 supported by cylinders 56 and 58 of system 22 in solid lines at height H, and in dotted lines tilted, as effected by tilting movement in the direction denoted by arrow B, such that end portion 34 thereof is raised to a height H3 above line 30, by operation of system 86 in a tilt setting mode. Referring also to FIG. 11, to effect a tilting movement such as shown in FIG. 10 under control of switches 110 and 112 (FIGS. 1 and 5), fluid control circuit 86 is controlled by controller 108 (FIG. 5) in a tilt setting mode wherein valves 102, V1 and V3 are commanded to open to allow fluid flow from gear pump 94 to the lower end of cylinder 58, to displace fluid from the upper end thereof to thereby retract that cylinder to effect an upward movement of end portion 34 (arrow B in FIG. 10). The tilting movement of header 24 in this manner can be facilitated by some upward movement of end portion 32 of header 24 as allowed by slotted connection 62 of cylinder 56, and/or, valve V2 can be opened to allow some retraction of cylinder 56 by a fractional portion of the retraction of cylinder 58, as required to raise end portion 32 as necessary to achieve a desired angle of tilt. Alternatively, cylinder 56 could be extended to lower end portion 32 to increase the angle of tilt. To facilitate the retraction of cylinder 58, fluid will be carried away through relief 100 as required.

Figure 12:
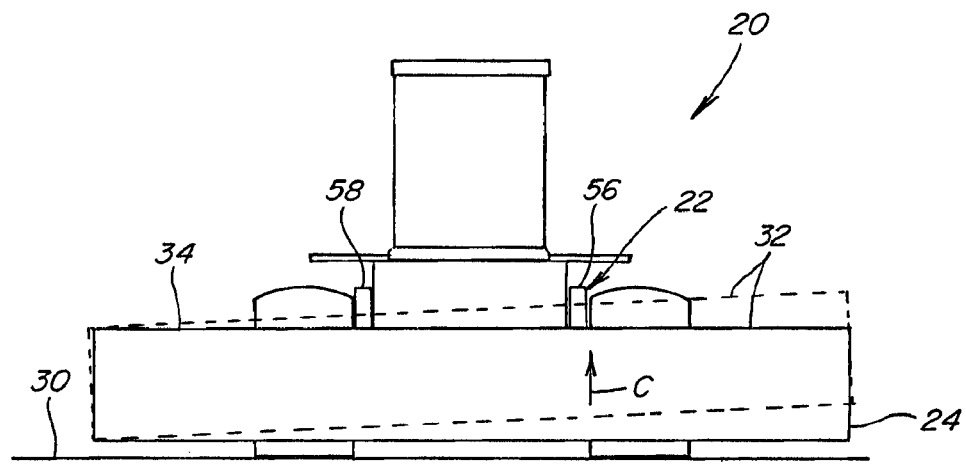
FIG. 12 is another simplified schematic front view of the machine, showing the header thereof at a level orientation in solid lines and tilted to an acute angle in dotted lines.
Figure 13:
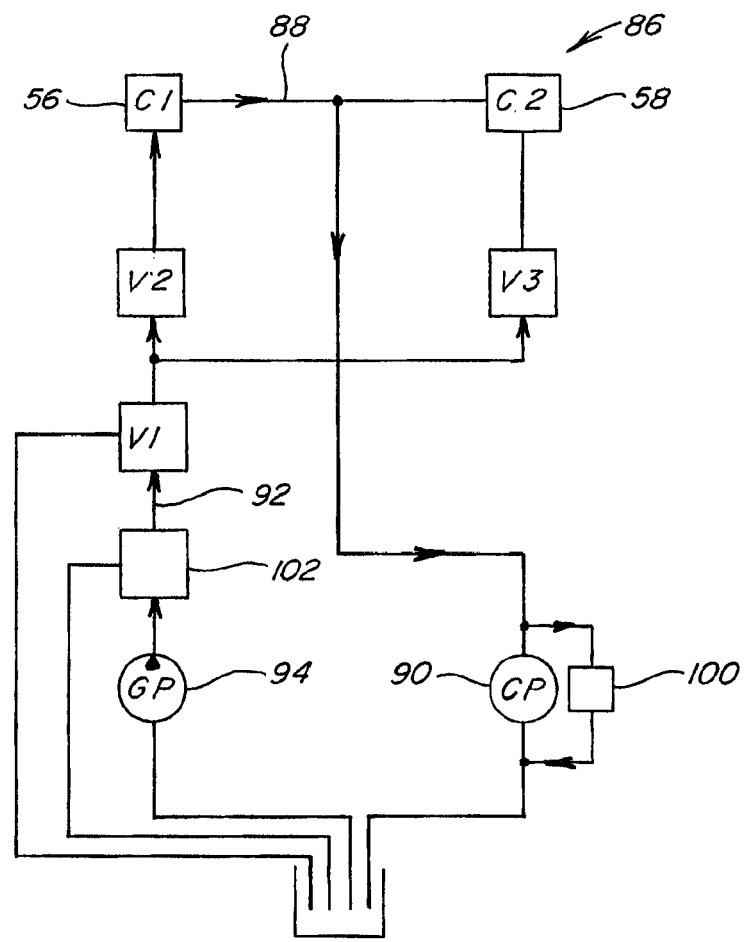
FIG. 13 is another simplified schematic representation of the operator control system and apparatus of FIG. 5 in an operating mode for tilting the header to a tilted position such as shown in FIG. 12.

In FIG. 12, machine 20 is shown with header 24 supported by cylinders 56 and 58 of system 22 in solid lines at an initially selected height, and in dotted lines tilted as denoted by arrow C in an opposite direction to that of FIG. 10, such that end portion 32 is instead raised in a tilt setting mode. Referring also to FIG. 13, to effect a selected tilting movement such as shown in FIG. 12, fluid control circuit 86 is operated in a tilt setting mode wherein valves 102, V1 and V2 are commanded to open to allow fluid flow from gear pump 94 to the lower end of cylinder 56, to displace fluid from the upper end thereof to thereby retract that cylinder to effect an upward movement of end portion 32. Here, it should be noted that by the tilting movement of header 24 can be facilitated by some upward movement of end portion 34 as allowed by slotted connection 62 of cylinder 58, and/or, cylinder 58 can be retracted by a fractional amount of the retraction of cylinder 56, as required to raise end portion 34 as necessary to achieve a desired angle of tilt. Cylinder 58 can also be extended to lower end portion 34 to increase the angle of tilt. To facilitate the retraction of cylinder 56, fluid displaced from the upper end thereof will be carried away through relief 100 as required.

Finally regarding operation, referring again to FIG. 5, to lower header 24 to a lower selected height from any of the above described positions in a lowering height setting mode, valve 102 can be commanded to operate in its relief mode to discharge the output of gear pump 94 to reservoir 98, valve V1 can be commanded to open to connect valves V2 and V3 to line 104, and either or both of those valves opened to allow fluid to be displaced from the bottom of cylinder 56 and/or cylinder 58. It should also be noted that advantageously, valves V1, V2 and V3 can be optionally variably operable, to allow controlling and varying the speeds at which cylinders 56 and 58 are extended and retracted in the height and tilt setting modes.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A windrowing machine, comprising:
a frame supported for movement over the ground;
a header extending transversely relative to the frame;
header support apparatus connecting the header to the frame, including first and second lift arms extending between the frame and transversely spaced locations on the header, respectively, and first and second height control cylinders, extending between the frame and the lift arms, respectively, each of the height control cylinders being connected to the frame by a connection that allows an end portion of the header supported thereby to be lifted from a first selected height without changing a length of a rod extending from a body of either height control cylinder;
an operator control system in operative connection with the height control cylinders and controllable for operating the height control cylinders for positioning the header at selectable heights in relation to the frame; and
at least one lift cylinder connected between the frame and at least one of said first and second lift arms, the at least one lift cylinder being an actuator operably controlled and changeable in length by the control system for lifting the header from the first height at which the header is positioned by the height control cylinders to a second height by applying and maintaining at least an upward force on the header without changing the length of the height control cylinders, wherein the header height is returned to the same selected first height upon removal of the force.

2. The windrowing machine of claim 1, wherein the connections are slotted connections that allow the height control cylinder and the header to be lifted from a selected height without changing the length of the height control cylinder such that both the rod and body of each height control cylinder is upwardly and downwardly movable relative to the frame.

3. The windrowing machine of claim 2, wherein the at least one lift cylinder comprises first and second lift cylinders each connected between the frame and the first and second lift arms adjacent to the first and second height control cylinders, respectively, both of said first and second lift cylinders being actuators changeable in length for lifting the header from a selected height at which the header is positioned by the height control cylinders by applying upward force to the header without changing the lengths of the height control cylinders wherein the header height is returned to the same selected height upon removal of the force.

4. The windrowing machine of claim 2, wherein each of the slotted connections includes an elongate slot having a length corresponding to substantially the full extension and retraction of the at least one lift cylinder.

5. The windrowing machine of claim 1, wherein the first and second height control cylinders comprise fluid operated cylinders, respectively, and the machine further comprises a fluid control circuit in connection with the height control cylinders and operable in a height setting mode for jointly extending or retracting the height control cylinders, and in a tilt setting mode for individually extending or retracting the height control cylinders.

6. The windrowing machine of claim 5, wherein the fluid control circuit is connected to and controllable by first and second operator controls operable simultaneously in a height setting mode for simultaneous varying the lengths of the height control cylinders for varying a height of the header in relation to the frame, and the controls being operable individually in a tilt mode for varying the length of one or both of the height control cylinders for varying the angular orientation of the header relative to the frame.

7. The windrowing machine of claim 1, wherein the control system is configured to have a lift mode wherein a rod of the at least one lift cylinder is actuated to apply the upward force to the header such that the height control cylinders and connected header are moved upwardly from the selected height established by the height control cylinders, the rod of each of said height control cylinders maintaining a fixed extended length from the body.

8. The windrowing machine of claim 1, wherein a rod of the at least one lift cylinder and the first height control cylinder are mounted to one of said first and second lift arms, a stroked rod length of the at least one lift cylinder being longer than a stroked rod length of the first height cylinder, wherein the connection is a slotted connection and mounts a body of the first height control cylinder to the frame, the slotted connection configured to permit movement between the body of the first height control cylinder and the frame equal to substantially the full extension and retraction of the at least one lift cylinder.

9. A windrowing machine, comprising:
a frame supported for movement over the ground;
a header extending transversely relative to the frame;
header support apparatus connecting the header to the frame, including at least one lift arm extending between the frame and the header, at least one height control cylinder, extending between the frame and the lift arm, the at least one height control cylinder connected to the frame by a connector which allows a portion of the header supported thereby to be lifted from a first selected height without changing a length of the at least one height control cylinder; and
an operator control system in operative connection with the at least one height control cylinder and controllable for operating the at least one height control cylinder for positioning the header at selectable heights in relation to the frame; and
at least one lift cylinder connected between the frame and the at least one lift arm adjacent to the at least one height control cylinder, the at least one lift cylinder being an actuator configured to adjust the height of the header and the position of the at least one height control cylinder with respect to the header independent of the at least one height control cylinder in response to a command from the operator control system, wherein the connector mounts a body of the first height control cylinder to the frame and is configured to permit vertical movement between the frame and both the body and rod of the at least one height control cylinder as well as the header equal to substantially the full extension and retraction of the at least one lift cylinder while maintaining the rod of the at least one height control cylinder at a fixed extended length.

10. The windrowing machine of claim 9, wherein the control system is configured to have a lift mode wherein a rod of the at least one lift cylinder is actuated to apply upward force to the header such that the at least one height control cylinder and connected header are moved upwardly from the selected height established by the at least one height control cylinder, the rod of the at least one height control cylinder maintaining the fixed extended length from the body and upon removal of the upward force to the header by the lift cylinder, the header and height control cylinder return to the selected height.

11. The windrowing machine of claim 10, wherein an active stroke length of the at least one lift cylinder is longer than an active stroke length of the at least one height control cylinder.

* * * * *